(12) United States Patent
Bachmair

(10) Patent No.: US 6,955,622 B2
(45) Date of Patent: Oct. 18, 2005

(54) PREASSEMBLED DRIVE MEANS UNIT INCLUDING A MOUNTING AID

(75) Inventor: Peter Bachmair, Munich (DE)

(73) Assignee: H. Winklhofer & Sohne GmbH and Co. KG, Munich (DE)

( * ) Notice: Subject to any disclaimer, the term of this patent is extended or adjusted under 35 U.S.C. 154(b) by 175 days.

(21) Appl. No.: 10/422,387

(22) Filed: Apr. 24, 2003

(65) Prior Publication Data

US 2004/0005952 A1 Jan. 8, 2004

(30) Foreign Application Priority Data

May 7, 2002 (DE) ..................................... 202 07 186 U

(51) Int. Cl.⁷ ............................. F16H 7/24; F16H 7/08; F16H 7/18; B66F 3/36
(52) U.S. Cl. ...................... 474/130; 474/111; 474/140; 254/100
(58) Field of Search ................................ 474/111, 129, 474/130, 140; 254/54, 100; 123/90.31

(56) References Cited

U.S. PATENT DOCUMENTS

| | | | | |
|---|---|---|---|---|
| 614,310 A | * | 11/1898 | Rupp | ........................ 474/130 |
| 4,373,240 A | * | 2/1983 | Castoe | ...................... 29/426.5 |
| 4,525,913 A | * | 7/1985 | Krukowski | ................... 29/270 |
| 4,869,708 A | | 9/1989 | Hoffmann et al. | |
| 4,869,709 A | | 9/1989 | Nagano | |
| 4,879,977 A | | 11/1989 | Restelli | |

FOREIGN PATENT DOCUMENTS

| | | | | |
|---|---|---|---|---|
| DE | (3623903) C1 | * | 12/1987 | ............. F16H/7/08 |
| DE | 3909458 | | 11/1989 | |
| DE | 4025126 | | 2/1992 | |
| DE | 19622122 | | 12/1997 | |
| EP | 0280365 B1 | | 4/1992 | |
| EP | 0725213 | | 8/1996 | |
| EP | 0793002 A1 | | 9/1997 | |
| EP | 0823543 A1 | | 2/1998 | |
| EP | 0843139 A2 | | 5/1998 | |
| EP | 0843139 A1 | | 6/1998 | |
| EP | 0893588 A2 | | 1/1999 | |
| EP | 1321631 A1 | | 6/2003 | |
| GB | 2347174 A | | 8/2000 | |
| JP | (61-48655) A | * | 3/1986 | .................. 474/111 |
| JP | (02-296046) A | * | 12/1990 | .................. 474/111 |
| JP | (04-272548) A | * | 9/1992 | .................. 474/111 |
| WO | WO (03/078866) A1 | * | 9/2003 | ............. F16H/7/24 |
| WO | WO (2004/003404) A1 | * | 1/2004 | ............. F16H/7/24 |

* cited by examiner

Primary Examiner—Marcus Charles
(74) Attorney, Agent, or Firm—Marshall, Gerstein & Borun LLP

(57) ABSTRACT

A preassembled drive means unit provided with a support body comprising at least one wheel receiver, which is adapted to receive therein a respective drive means wheel, and an endless drive means, which is adapted to be put around said drive means wheels. This drive means unit comprises a replaceable mounting aid which is arranged in the area of the wheel receiver instead of a drive means wheel. One or a plurality of the drive means wheels can be replaced by the mounting aid. The whole preassembled drive means unit is held in position by the mounting aid, although one or a plurality of the drive means wheels of the drive means unit are not installed. In this way, it will be more easily possible to assemble the drive means unit and to attach the drive means wheels.

24 Claims, 3 Drawing Sheets

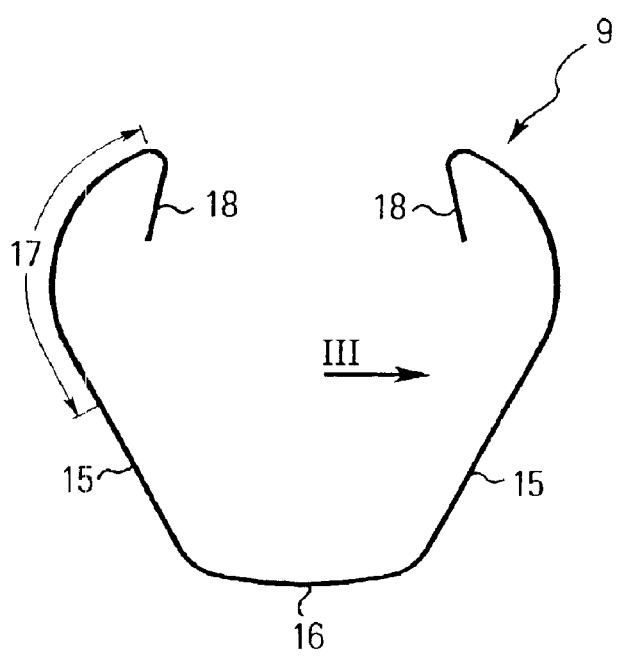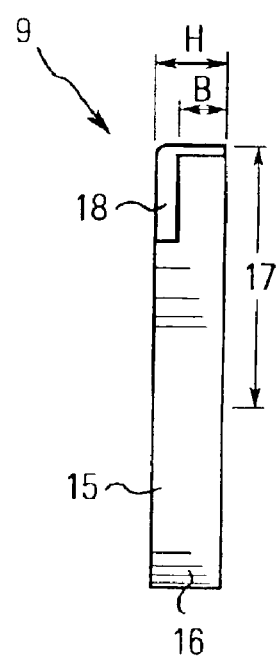
*FIG.2*   *FIG.3*

PREASSEMBLED DRIVE MEANS UNIT INCLUDING A MOUNTING AID

CROSS REFERENCE TO RELATED APPLICATION

This application claims priority to German Patent Application No. 20207186.3, filed May 7, 2002.

FIELD OF THE INVENTION

The present invention relates to a preassembled drive means unit provided with a support body comprising at least one wheel receiver, which is adapted to receive therein a respective drive means wheel, and an endless drive means, which is adapted to be put around the drive means wheels.

BACKGROUND OF THE INVENTION

Preassembled drive means units are known in the prior art and are used e.g. for control chains of internal combustion engines. DE-OS 3 909 458 discloses e.g. a sprocket-retaining and chain-guide element for a control chain in the case of which arcuate grooves are provided for loosely accommodating the sprockets and the control chain. A groove for accommodating a sprocket is formed by a releasable plate and the sprocket-retaining and chain-guide element. In addition, one embodiment shows the sprocket-retaining and chain-guide element together with a pivotably supported chain tensioning means which is tensioned with the aid of a compression spring.

Another preassembled drive means unit is described in U.S. Pat. No. 4,879,977. In this device two gears are held in position by a suitably shaped guide plate. In order to permit the gears to be arranged in respective openings provided in the guide plate, the chain must be still open. When the gears have been inserted in the respective openings, the chain is put round the gears and closed.

It is, for example, also possible to implement the support body as a multi-part component, as has been done in the case of the devices according to U.S. Pat. No. 4,869,709 or EP-A-0 280 365, so that the drive means wheels can also be arranged in a condition in which the endless drive means has already been put around them.

EP-A-0 848 139 discloses a preassembled traction means drive unit comprising an integral support body. In the case of this preassembled traction means drive unit, the traction means wheels, with the traction means put around them, are positioned for mounting in holding pockets and fixed by means of a locking element formed integrally with a holding device.

After having been assembled, the above-mentioned preassembled drive means units including the support body remain on a drive unit, especially an engine block of an internal combustion engine. The embodiments of the drive means unit mainly aim at permitting the drive means wheels and the endless drive means to be preassembled. Specific components of the drive means unit fulfil functions assigned thereto, both during the main assembly as well as during the future use at the drive unit. Other components and functions become completely unimportant when the unit is operated later on. The various tasks resulting from the assembly and the future use lead—especially with respect to the use of the preassembled drive means unit in the field of automobile industry, the high number of pieces existing in this field of industry and the increasing degree of automation—to a constant demand for improvements and a necessary adaptation to higher demands.

SUMMARY OF THE INVENTION

It is the object of the present invention to provide a preassembled drive means unit of the type mentioned at the beginning, which is provided with an improved design with respect to the various desired functional requirements and which, in particular, facilitates the assembly of the drive means unit and the mounting of the drive means wheels.

According to the present invention, this object is achieved by a replaceable mounting aid which is arranged in the area of the wheel receiver instead of a drive means wheel.

This solution is simple and facilitates the insertion of one or more drive means wheels into the endless drive means. According to the present invention, one or more of the drive means wheels are replaced by the mounting aid. Since the mounting aid is provided instead of a drive means wheel in the preassembled drive means unit, the whole preassembled drive means is held in position by the mounting aid, although one or a plurality of the drive means wheels of the preassembled drive means unit are not installed.

A further advantageous embodiment can, in particular, be of such a nature that the mounting aid is adapted to be replaced by a drive means wheel so that, when the drive means unit attached to the drive unit is in operation, a mounting aid will no longer exist. This leads to a reduction of the amount of material required and to lower costs. Due to the replaceability of the mounting aid, the mounting aid can be reused in an advantageous manner. In order to be able to re-introduce the mounting aid again and again in the assembly circle so as to reduce costs, the mounting aid can, according to one advantageous further development, be designed such that it is adapted to be repeatedly replaced by a drive means wheel.

According to another advantageous further development of the present invention, the mounting aid additionally fulfills the task of producing a tension in the chain so that the preassembled traction means drive can be handled more easily and will not disintegrate when it is being installed. For this purpose, the drive means unit can be designed such that the mounting aid is elastically pretensioned in the preassembled drive means unit and is installed such that it produces a tensioning force in the endless drive means.

In this respect, the mounting aid can also be designed in such a way that, in a drive means unit which has already been provided with at least one drive means wheel, the mounting aid pulls the at least one drive means wheel via the endless drive means into wheel receiver, which is associated with the at least one drive means wheel, and secures the preassembled drive means unit in position. Also this embodiment has the effect that the preassembled drive means unit will hold together more stably before it is installed. It is also imaginable that all sprockets are replaced by mounting aids.

A tensioning force in the endless drive means can especially be produced in that the endless drive means is spread by the mounting aid in the area of the wheel receiver. This has the advantage that, due to such spreading, room for an unproblematic insertion of the drive means wheel will simultaneously be provided, so that the assembly operation is facilitated once more. For this purpose, especially the inside width of the mounting aid in the preassembled drive means unit can, at least at one point, be larger than the diameter of the drive means wheel which will be mounted instead of the mounting aid. This measure permits a particularly simple insertion of the drive means wheel. The mounting aid can e.g. be designed such that it is U-shaped. It can also comprise at least two legs which are elastically pressed against the endless drive means. By means of these at least two legs, the endless drive means is spread and the tensioning force is simultaneously produced in the endless drive means. In addition, the legs can be supported elastically between the wheel receiver and the endless drive means, whereby the endless drive means will be guided in spaced relationship with the support body.

In addition, the mounting aid can be installed in the preassembled drive means unit in such a way that the legs are directed away from the support body, whereby insertion of the drive means wheel into the wheel receiver, which may be implemented e.g. as a holding pocket, will be facilitated.

In order to facilitate the replacement of the mounting aid by the drive means wheel associated with the mounting aid, the mounting aid can be provided with at least one handle which acts on the legs and which, when actuated, can be used for pressing the legs together, so that the mounting aid can be removed, and the elastic pretension of the legs and, consequently, the tensioning force in the endless drive means can be reduced.

This handle can, for example, be arranged on the legs themselves and, in particular, it can be implemented as a bent or folded end section of the legs. These embodiments are advantageous from the production engineering point of view because they can be produced easily. Another advantageous embodiment is so designed that the handle is arranged such that it is freely accessible from a location outside of the drive means unit.

In accordance with another advantageous embodiment, the legs can be interconnected by an essentially elastic, preferably arcuate portion. This portion can rest e.g. on the support body, in particular the holding pocket of the wheel receiver, in which the drive means wheel associated with the mounting aid is held when the unit is in operation.

On the other hand, this portion may also face away from the support body and serve as a guide element for the endless drive means.

The mounting aid can be implemented in one-piece as a single component and it can be produced e.g. from spring steel, especially from a spring steel sheet.

Furthermore, the drive means unit can be designed such that at least one tensioning means is arranged on the support body, the tensioning means applying a pretension to the endless drive means between two drive means wheels or between the mounting aids provided instead of these drive means wheels. The provision of the tensioning means on the support body offers the possibility to compose a compact drive means unit in advance, which can be mounted in a single mounting step. The tensioning means can also be utilized for pretensioning the endless drive means, in particular in cooperation with the mounting aid implemented as a tensioning device, whereby the drive means wheels can be secured in the position in which they have been mounted.

One advantageous embodiment is designed such that the tensioning means is implemented as a tensioning rail which is pivotably arranged on the support body. Due to the pivotable arrangement, the tensioning rail is easy to mount and various lever forces can be achieved by different tension application points.

According to another advantageous variant, the drive means unit can be configured such that the tensioning means is pretensioned by a spring means in the case of which various force characteristics can be realized by different design possibilities for different cases of use. The spring means can be implemented as a leaf spring, whereby a simple structural design of the spring means comprising only a small number of components is possible.

The support body can, according to an advantageous embodiment, consist of a aluminium diecast part, whereby a high strength in combination with advantageous vibration characteristics will be achieved. In addition to this preferred embodiment, it is, however, also possible to realize the support body in form of a sheet metal or of a aluminium bent part and also as a plastic moulded part, so as to optimize the costs.

BRIEF DESCRIPTION OF THE DRAWINGS

In the following, embodiments of the present invention will exemplarily be explained in detail with reference to the drawings, in which:

FIG. 2 shows the mounting aid of FIG. 1 in a top view;

FIG. 3 shows a side view of the mounting aid of FIG. 2;

DETAILED DESCRIPTION OF THE INVENTION

Figure 1:
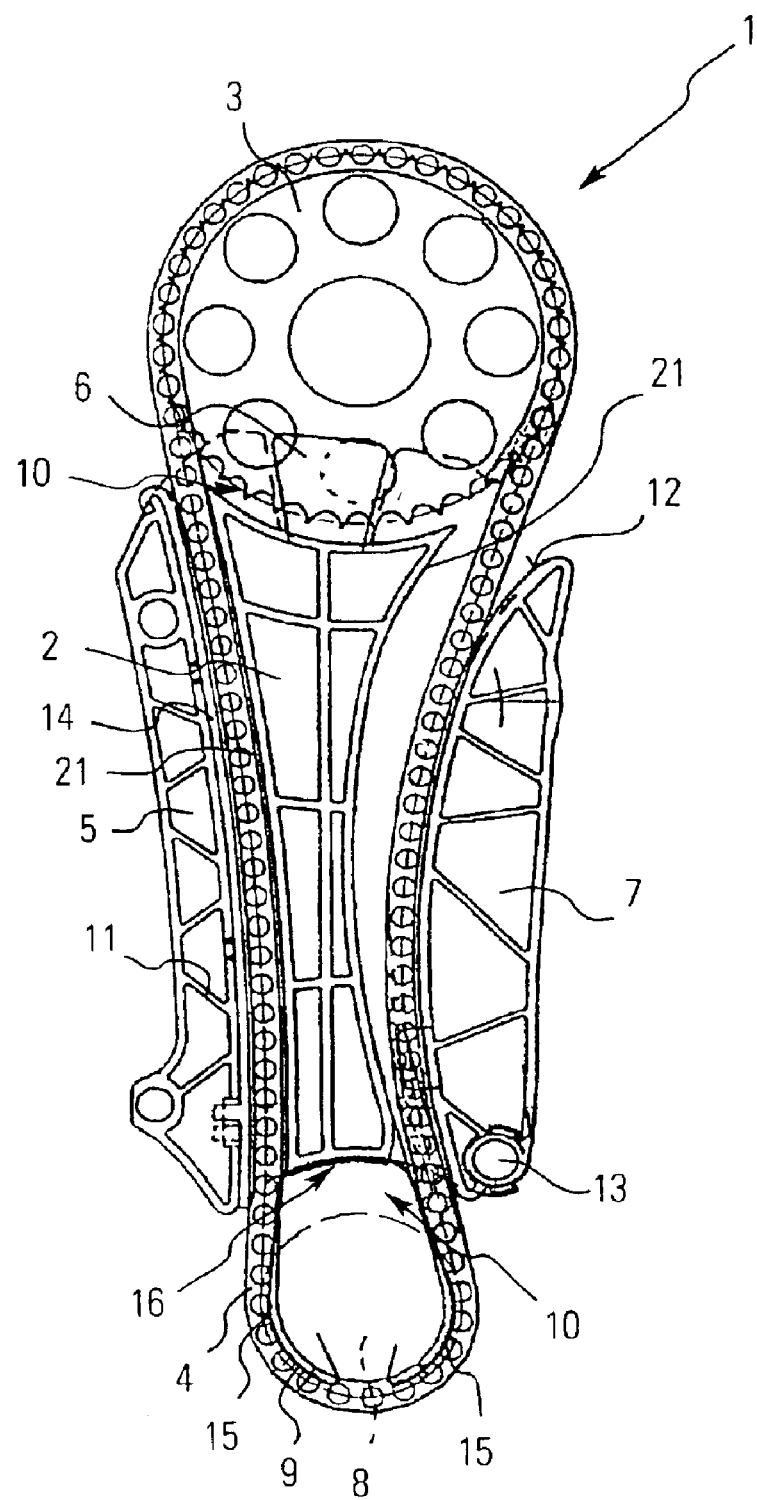
FIG. 1 shows a top view of a preassembled drive means unit according to the present invention, which is provided with a mounting aid.

The embodiment of a preassembled drive means unit 1 shown in FIG. 1 is provided as a control drive on an internal combustion engine.

The preassembled drive means unit 1 comprises a substantially plate-like support body 2, a camshaft sprocket 3, an endless drive means implemented as a drive chain 4, a guide rail 5 secured to the support body 2, a wheel receiver 6 for the camshaft sprocket 3 as well as a receiver and a locking means for a tensioning rail 7. Instead of the crankshaft sprocket 8 (broken line), the preassembled drive means unit 1 has additionally provided thereon a mounting aid 9 in the wheel receiver 10 in question.

The wheel receiver 6, 10 can be implemented as holding pockets defined by radially securing side walls, which are connected to the support body 2 or which are formed by the support body 2, as well as by axial securing elements. The guide rail 5 as well as the tensioning rail 7 and the support body 2 have formed thereon stiffening ribs 11 so as to increase the strength.

For tensioning the drive chain 4, the tensioning rail 7 is arranged on the support body between the camshaft sprocket 3 and the location of the crankshaft sprocket 8 outside of the area enclosed by the drive chain 4, and it is provided with an arcuate pressure-exerting surface 12.

The tensioning rail end facing the crankshaft sprocket 8 is rotatably supported on a pin 13, which is connected to the support body 2.

The guide rail side facing the drive chain 4 is provided with replaceable guide linings 14 for wear protection, the ends of the guide linings 14 extending around the ends of the guide rail 5.

In the area of the crankshaft sprocket 8, the support body 2 is open, with the exception of a securing side wall. The mounting aid 9 rests on the side wall and spreads the drive chain 4 in approximately the same way in which the drive chain 4 would be spread if the mounting aid 9 had been replaced by the crankshaft sprocket. Hence, the camshaft sprocket 3 is drawn into the holding pocket 6 by the tensioning force exerted by the mounting aid 9 and secured in position in said holding pocket. In addition, the mounting aid 9 takes up the tensioning force produced by the tensioning rail 7 and produces a counterforce so that the tensioning rail 7 is also held at a stable, pretensioned mounting position due to the tensioning force produced by the mounting aid 9.

As can be seen in FIG. 1, at least an inside width of the mounting aid 9 is approximately as large as, preferably, however, larger than the diameter of the crankshaft sprocket so that the crankshaft sprocket 8 can be mounted easily.

FIG. 2 shows a top view of the mounting aid of FIG. 1.

As can be seen in FIG. 2, the mounting aid 9 is approximately U-shaped, the two legs 15 being interconnected by an arcuate portion 16 resting on the side wall of the support body 2 of the drive means unit 1. Each of the legs 15 comprises an outwardly bent area 17 located approximately at the point at which the crankshaft sprocket 8 will be located when the drive means unit 1 has been fully assembled.

The distance between the connecting portion 16 and the ends of the legs 15 is chosen such that, when the preassembled drive means unit 1 is mounted on the drive unit, e.g. an internal combustion engine, the chain will essentially be guided as if the crankshaft sprocket 8, instead of the mounting aid 9, were attached. In particular, the distance between the camshaft sprocket 3 and the crankshaft sprocket 8 existing in the fully assembled drive means unit 1 is taken into account by the mounting aid 9 in form of the guidance of the endless drive means. The preassembled drive means unit can, in this way, already be attached to the drive unit at its final mounting position, although not all the drive means wheels have been mounted.

The mounting aid 9 is additionally provided with a handle 18, which, when actuated, will press the legs 15 together. In the embodiment of FIG. 2, the handle 18 is implemented as a bent area at the end of each leg 15, the bent area extending away from the drive chain 4 (cf. FIG. 1) into the area spread by the mounting aid 9. In this area, the handle 18 is freely accessible for easy mounting and the mounting aid 9 can easily be replaced by the crankshaft sprocket 8 without any complicated manipulations being necessary. Also separate components, e.g. grips or gripping portions, may serve as a handle 18, the separate components being subsequently fixed to the mounting aid 9.

The mounting aid 9 is produced from an elastic material so that the legs 15 will not lose their elasticity even if the handle is reused more than once. The handle 18 can especially be produced from spring steel. The height H of the mounting aid 9 corresponds at least to the inner width B of the chain (cf. FIG. 3).

In the side view of FIG. 3, which shows the mounting aid 9 in a view along the arrow III of FIG. 2, it can be seen that the handle 18 may especially project beyond the width B of the chain so that the crankshaft sprocket 8 can be inserted in a condition in which the mounting aid 9 is still mounted. When the sprocket has been inserted, the mounting aid 9 projecting beyond the drive chain 4 can be removed from the drive means unit 1 with the aid of the handle 18. The chain will then move into contact with the crankshaft sprocket 8 under the influence of the tensioning rail 7. The removed mounting aid 9 can be reused later on.

Alternatively, the mounting aid 9 can also be removed directly before the crankshaft sprocket is attached to the chain.

Figure 4:
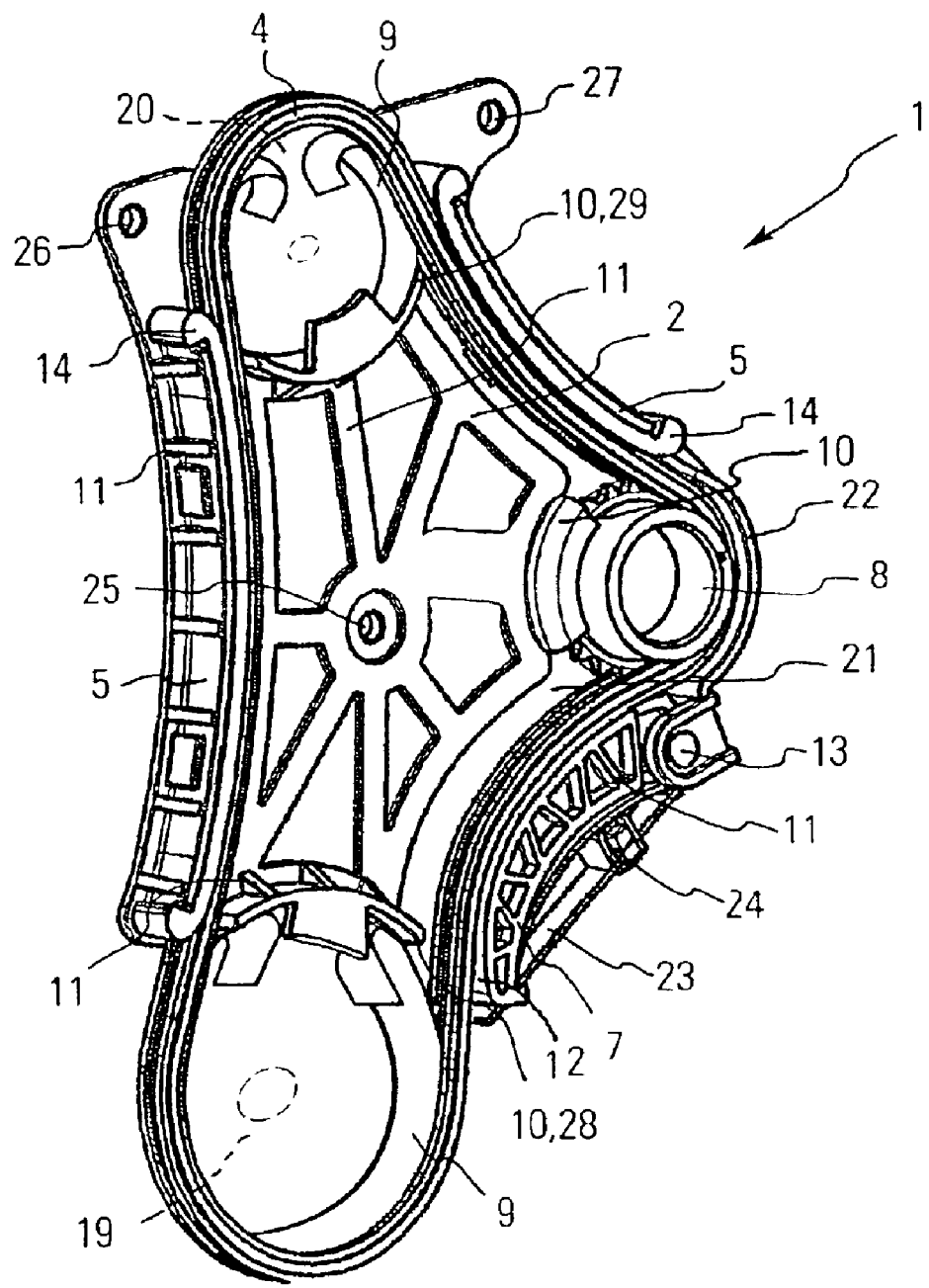
FIG. 4 shows a second embodiment of a preassembled drive means unit according to the present invention, which is provided with two mounting aids.

The embodiment of FIG. 4 shows a preassembled drive means unit 1 used for driving units of an internal combustion engine, which is not shown. In the embodiment of FIG. 4, components whose structural design and/or function correspond(s) to that/those of the components of the embodiment according to FIG. 1 are designated by the same reference numerals as in the case of the embodiment according to FIG. 1. To make things easier, only the differences in comparison with the embodiment of FIG. 1 will be pointed out in the description of the embodiment of FIG. 4. The various elements and shapes of the embodiments according to FIG. 1 and 4 can be combined in any arbitrary manner.

In the embodiment of FIG. 4, the preassembled drive means unit 1 is provided with receiver 10 for a total of three sprockets 8, 19, 20. The sprockets 19 and 20 drive units-of the internal combustion engine and are driven by the crankshaft sprocket 8 via the drive chain 4.

The preassembled drive means unit 1 of FIG. 4 additionally comprises two outer arcuate guide rails 5 on the support body 2. The guide rails 5 are arranged between the sprockets 19 and 20 as well as between the sprocket 20 and the crankshaft sprocket 8. In order to increase the strength of the guide rails, wedge-shaped reinforcement elements (no reference numeral) are formed on the outer sides as well as on the radially securing side walls defined by the support body. The support body 2 is reinforced by struts along the inner area delimited by the drive chain 4 and the sprockets 8, 19, 20 as well as by struts traversing this inner area in a star-shaped configuration.

For tensioning the drive chain 4, a tensioning rail 7 provided with an arcuate pressure-exerting surface 12 is attached to the support body 2, outside of the drive chain 4, between the crankshaft sprocket 8 and the sprocket 19. The tensioning rail end facing the crankshaft sprocket 8 is, just as in the embodiment of FIG. 1, rotatably supported on a pin 13 connected to the support body 2. For reinforcing the support body 2 in the area of the crankshaft sprocket 8, an outer side wall enclosing the outer circumference of the crankshaft sprocket 8 is formed between the guide rail 5, which extends between the sprocket 20 and the crankshaft sprocket 8, and the pin 13, and an outer side is provided with wedge-shaped reinforcement elements. The tensioning force required for tensioning the drive chain 4 is applied by a leaf spring 23 acting on the outer side of the tensioning rail 7 which faces away from the pressure-exerting surface 12. The leaf spring 23 is adapted to be tensioned by a tensioning sleeve 24, the tensioning sleeve 24 resting on the fixedly clamped outer part of the two-part leaf spring 23. For finally mounting the preassembled drive means unit, a hole 25 is provided at the center of the support body 2 and two additional holes 26 and 27 are provided at the sides of the sprocket 20.

The support body 2 is open in the area of the sprockets 19 and 20. The respective holding pockets 28, 29 of the sprockets 19, 20 have inserted therein a mounting aid 9 according to the present invention instead of the respective associated sprocket 19 and 20. The connecting portion 16 serves as a guide element for the drive chain 4, e.g. in the case of the mounting aid 9 associated with the sprocket 19, whereas in the area of the end sections of the legs 15 the mounting aid 9 rests on the support body 2. The mounting aid 9 associated with the sprocket 20 is, however, exemplarily shown in the mounting position corresponding to that shown in the embodiment according to FIG. 1.

By means of the mounting aid, the drive chain 4 is approximately guided as if the sprockets 19, 20 were installed. The mounting aids 9 pretension the chain 4 at the wheel receiver 10 in such away that the sprockets 19, 20 can be inserted in the preassembled drive means unit 1 without any complicated manipulations. In the course of this process, the mounting aids 9 are elastically deformed due to the fact that they cooperate with the tensioning force produced by the tensioning rail 7.

The inside width of the space spread by the mounting aids 9 corresponds, at least in certain sections thereof, to the diameter of the respective associated sprocket 19, 20.

As in the embodiment shown in FIG. 1, the mounting aids 9 are removed shortly after the attachment of the sprockets 19, 20 and are reused later on.

I claim:

1. A preassembled drive unit (1), comprising a support body (2), at least one drive wheel (3, 8), at least one removable mounting aid (9) and an endless drive (4);

the support body (2) having at least one wheel receiver (6, 10) and at least one further wheel receiver (10, 28, 29);

each of the at least one drive wheels (3, 8) is received in a respective wheel receiver (6, 10);

each of the at least one removable mounting aid (9) is received in a respective further wheel receiver (6, 10, 28, 29); and the endless drive (4) is wound around the at least one drive wheel (3, 8) and the at least one removable mounting aid (9), securing the at least one drive wheel (3, 8) in position, the removable mounting aid (9) retaining the endless drive (4) so as to accommodate a further drive wheel (8, 19, 20) in the further wheel receiver, said further drive wheel (8, 19, 20) being engaged by the endless drive upon removal of the removable mounting aid (9).

2. A preassembled drive unit (1) according to claim 1, wherein the mounting aid (9) is replaceable by the further drive wheel (8, 19, 20).

3. A preassembled drive unit according to claim 1, wherein the mounting aid (9) is elastically pretensioned in the wheel receiver (6, 10, 28, 29) and such that it produces a tensioning force in the endless drive (4).

4. A preassembled drive means unit (1) according to claim 1, wherein the mounting aid (9) spreads the endless drive means (4) in the area of the wheel receiver (6, 10, 28, 29).

5. A preassembled drive means unit (1) according to claim 1, wherein the mounting aid (9) is adapted to repeatedly retain the endless drive (4) so as to accommodate a further drive wheel (8, 19, 20) in the further wheel receiver, said further drive wheel (8, 19, 20) being engaged by the endless drive upon removal of the removable mounting aid (9).

6. A preassembled drive unit (1) according to claim 1, wherein the mounting aid (9) comprises two legs (15) which are elastically pressed against the endless drive (4).

7. A preassembled drive unit (1) according to claim 6, wherein the legs (15) are directed away from the support body (2).

8. A preassembled drive unit (1) according to claim 6, wherein the mounting aid (9) is provided with at least one handle (18) which acts on the legs (15) and which, when actuated, can be used for pressing said legs (15) together so as to remove the mounting aid (9).

9. A preassembled drive unit (1) according to claim 8, wherein the handle (18) is arranged to be freely accessible from a location outside of the drive unit (1).

10. A preassembled drive unit (1) according to claim 8, wherein the handle (18) is arranged on the legs (15).

11. A preassembled drive unit (1) according to claim 10, wherein the handle (18) is implemented as one of a bend and folded end section of the legs (15).

12. A preassembled drive unit (1) according to claim 6, wherein the legs (15) are interconnected by an essentially elastic connecting portion (16).

13. A preassembled drive unit (1) according to claim 12, wherein one of the mounting aids (9) rests on the support body (2) in the area of said connecting portion (16).

14. A preassembled drive unit (1) according to claim 12, wherein the essentially elastic connecting portion (16) is arcuate.

15. A preassembled drive unit (1) according to claim 1, wherein the inside width (W) of the mounting aid (9) corresponds, at least at one point, to at least the diameter of the further drive wheel (8, 19, 20).

16. A preassembled drive unit (1) according to claim 1, wherein the mounting aid (9) is a one-piece component.

17. A preassembled drive unit (1) according to claim 16, wherein the mounting aid (9) is produced as a one-piece component from strip stock.

18. A preassembled drive unit (1) according to claim 1, wherein the mounting aid (9) is produced from spring steel.

19. A preassembled drive unit (1) according to claim 1, wherein the mounting aid (9) has an outer surface facing an inner surface of the endless drive, said outer surface of the mounting aid (9) having a height (H) which is at least co-extensive with, or extends greater than, a height of the inner surface of the endless drive.

20. A preassembled drive unit (1) according to claim 1, and a guide rail (5) for guiding the endless drive (4) is arranged between at least two drive wheels (3, 8, 19, 20).

21. A preassembled drive unit (1) according to claim 1, and at least one tensioning means (7) is arranged on the support body, the tensioning means (7) applying a pretension to the endless drive (4) between two drive wheels (3, 8, 19, 20).

22. A preassembled drive unit (1) according to claim 21, wherein the tensioning means (7) comprises a tensioning rail (7) which is pivotably arranged on the support body (2).

23. A preassembled drive unit (1) according to claim 21, wherein the tensioning means is pretensioned by a spring means (23, 24).

24. A preassembled chain drive unit (1), comprising a support body (2), at least one sprocket wheel (3, 8), at least one removable mounting aid (9) and an endless drive chain (4);

the support body (2) has at least one wheel receiver (6, 10) and at least one further wheel receiver (10, 28, 29);

each of the at least one sprocket wheel (3, 8) is received in a respective wheel receiver (6, 10);

each of the at least one removable mounting aid (9) is received in a respective further wheel receiver (10, 28, 29); and the endless drive chain (4) is wound around the at least one sprocket wheel (3, 8) and the at least one removable mounting aid (9), securing the at least one sprocket wheel (3, 8) in position, the removable mounting aid (9) retaining the endless drive chain (4) so as to accommodate a further sprocket wheel (8, 19, 20) in the respective further wheel receiver, said further sprocket wheel (8, 19, 20) being engaged by the endless drive chain (4) upon removal of the removable mounting aid (9).

* * * * *

UNITED STATES PATENT AND TRADEMARK OFFICE
CERTIFICATE OF CORRECTION

PATENT NO. : 6,955,622 B2
APPLICATION NO. : 10/422387
DATED : October 18, 2005
INVENTOR(S) : Peter Bachmair It is certified that error appears in the above-identified patent and that said Letters Patent is hereby corrected as shown below:

On the Title Page
Item (73) Assignee:

Please delete "H. Winklhofer & Sohne GmbH and Co. KG" and replace with --Joh. Winklhofer & Söhne GmbH und Co. KG--.

Signed and Sealed this

Twenty-fifth Day of July, 2006

JON W. DUDAS
*Director of the United States Patent and Trademark Office*